UNITED STATES PATENT OFFICE.

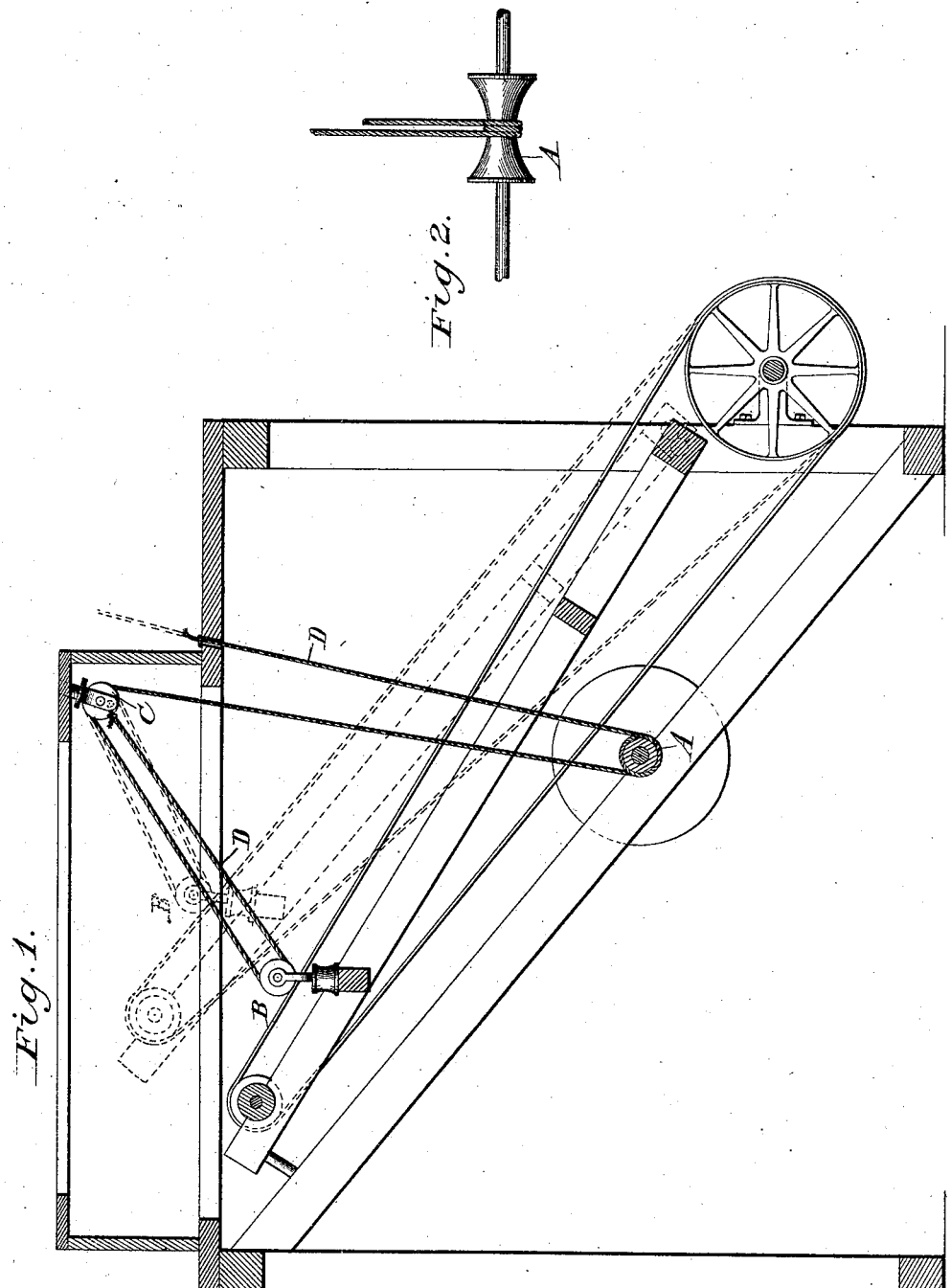

JOSEPH CARDY, OF TAMPA, FLORIDA.

MEANS FOR OPERATING BUTTING-SAWS.

SPECIFICATION forming part of Letters Patent No. 291,148, dated January 1, 1884.

Application filed October 6, 1883. (Model.)

*To all whom it may concern:*

Be it known that I, JOSEPH CARDY, a citizen of the United States, residing at Tampa, in the county of Hillsborough, State of Florida, have invented a new and useful Improvement in Operating Butting-Saws, of which the following is a specification.

Figure 1 is a side view of the machine, partly in section; and Fig. 2 is a front view of the concave roller.

My invention relates to an improvement in operating butting-saws, in which I use a concave drum, A, in connection with pulley-block B, attached to saw-frame, and pulley-block C, attached to top of saw-box, through which a rope passes to concave drum, A, making three turns around said concave drum A, the end afterward passing up through the deck of mill for operator's use, by which, through tension on said rope, he is enabled to raise or feed the saw up to the timber to be cut. He can also graduate the feed, by tension, to suit the kind of timber, and by slacking on rope the saw-frame falls again to its first position on bearing-beams.

The vertical range of tension-rope is equal to that of the saw—say about twenty (20) inches for a four (4) foot saw.

What I claim as my invention, and desire to secure by Letters Patent, is—

The simple mechanism as fully shown—the slowly-revolving concave pulley A, the tension-rope feed D, passing through pulley-block B, attached to saw-frame, and pulley-block C, attached to top of saw-box, from thence three times around concave drum A, the end of said friction-rope passing up through deck to hand of operator, all of which is adapted to the operating of butting-saws, as herein substantially set forth.

JOSEPH CARDY.

Witnesses:
 WILLIAM J. RICHMOND,
 J. P. DEVEREUX.